(12) United States Patent
Aoki et al.

(10) Patent No.: US 12,061,025 B2
(45) Date of Patent: Aug. 13, 2024

(54) POWER ELEMENT AND EXPANSION VALVE USING SAME

(71) Applicant: FUJIKOKI CORPORATION, Tokyo (JP)

(72) Inventors: Yutaro Aoki, Tokyo (JP); Junya Hayakawa, Tokyo (JP); Yusuke Takahashi, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 227 days.

(21) Appl. No.: 17/778,955

(22) PCT Filed: Nov. 25, 2020

(86) PCT No.: PCT/JP2020/043821
§ 371 (c)(1),
(2) Date: May 23, 2022

(87) PCT Pub. No.: WO2021/106932
PCT Pub. Date: Jun. 3, 2021

(65) Prior Publication Data
US 2022/0412616 A1 Dec. 29, 2022

(30) Foreign Application Priority Data
Nov. 25, 2019 (JP) .................................. 2019-212451

(51) Int. Cl.
*G05D 27/00* (2006.01)
*F16K 31/00* (2006.01)
*F25B 41/335* (2021.01)

(52) U.S. Cl.
CPC .......... *F25B 41/335* (2021.01); *F16K 31/002* (2013.01)

(58) Field of Classification Search
CPC ............................ F25B 41/335; F16K 31/002
(Continued)

(56) References Cited

FOREIGN PATENT DOCUMENTS

| CN | 106864973 A | 6/2017 |
|---|---|---|
| EP | 3770536 A1 | 1/2021 |

(Continued)

OTHER PUBLICATIONS

Office Action dated Aug. 30, 2023 for the corresponding Chinese Application No. 202080076623.0, with English translation.
(Continued)

*Primary Examiner* — Davis D Hwu
(74) *Attorney, Agent, or Firm* — Lucas & Mercanti, LLP (57) ABSTRACT

Provided are a power element and an expansion valve using same that are capable of suppressing local deformation of a diaphragm or the like while ensuring the transfer efficiency of a refrigerant. A power element includes a diaphragm; an upper lid member that is overlapped on one surface in the vicinity of the outer circumference of the diaphragm and forms a pressure working chamber PO with the diaphragm; a receiving member that is overlapped on another surface in the vicinity of the outer circumference of the diaphragm and forms a refrigerant inflow chamber LS with the diaphragm; and a stopper member housed in the refrigerant inflow chamber LS and in contact with the diaphragm, wherein a plate thickness near a support point of the diaphragm is thicker than a plate thickness at a central portion of the diaphragm.

6 Claims, 6 Drawing Sheets

(58) Field of Classification Search
USPC .................................................. 236/92.008
See application file for complete search history.

(56) References Cited

FOREIGN PATENT DOCUMENTS

| | | |
|---|---|---|
| JP | H07-133972 A | 5/1995 |
| JP | 3388365 B2 * | 3/2003 |
| JP | 2019163896 A | 9/2019 |
| KR | 101774166 B1 | 9/2017 |

OTHER PUBLICATIONS

PCT, Written Opinion of ISA dated Jan. 12, 2021 for the corresponding application No. PCT/JP2020/043821, with English translation.
Office Action dated Apr. 11, 2023 for the corresponding Japanese Application No. 2019-212451, with English translation.
Extended European Search Report dated Oct. 20, 2023 for the corresponding European Application No. 20892779.8.
International Search Report dated Jan. 12, 2021 for the corresponding application No. PCT/JP2020/043821, with English translation.

* cited by examiner

POWER ELEMENT AND EXPANSION VALVE USING SAME

CROSS REFERENCE TO RELATED APPLICATION

This Application is a 371 of PCT/JP2020/043821 filed on Nov. 25, 2020 which, in turn, claimed the priority of Japanese Patent Application No. 2019-212451 filed on Nov. 25, 2019, both applications are incorporated herein by reference.

TECHNICAL FIELD

The present invention relates to a power element and an expansion valve using same.

BACKGROUND OF THE INVENTION

Conventionally, in the refrigeration cycles used in air conditioners or the like mounted in automobiles, temperature-sensitive temperature expansion valves are used that adjust the amount of refrigerant passing through according to the temperature. In such temperature expansion valves, power elements are employed to drive the valve element with the pressure of an enclosed working gas.

The power element provided in the expansion valve illustrated in Patent Document 1 is provided with a diaphragm, an upper lid member that forms a pressure working chamber in which a working gas is sealed between the diaphragm, a receiving member provided with a through hole in its central portion and arranged on the opposite side of the upper lid member with respect to the diaphragm, and a stopper member disposed in a fluid inflow chamber formed between the diaphragm and the receiving member and connected to an operation rod for driving a valve element. The diaphragm is made of a thin and flexible metal plate.

If the temperature of the refrigerant flowing into the fluid inflow chamber is low, heat is taken from the working gas in the pressure working chamber to cause contraction, and if the temperature of the refrigerant is high, heat is applied to the working gas in the pressure working chamber to cause expansion. Since the diaphragm deforms according to the contraction/expansion of the working gas, the valve element can be opened and closed via the stopper member and the operating rod in accordance with the amount of deformation, whereby adjustment of the flow rate of the refrigerant passing through the expansion valve can be performed.

CITATION LIST

Patent Documents

[Patent Document 1] Japanese Unexamined Patent Application Publication No. 2019-163896

SUMMARY OF INVENTION

Technical Problem

Incidentally, in general refrigeration cycles, a strainer is provided in order to capture foreign matter mixed in the refrigerant flowing through the pipe. However, minute foreign matter may pass through the strainer and enter the power element. In such a case, foreign matter may enter between the receiving member and the diaphragm, which may cause local deformation of the diaphragm. On the other hand, if the strainer is provided with the ability to capture even minute foreign matter, the pressure loss in the strainer may increase and the transfer efficiency of the refrigerant in the refrigeration cycle may deteriorate.

Accordingly, an object of the present invention is to provide a power element and an expansion valve using same that are capable of suppressing local deformation of a diaphragm or the like while ensuring the transfer efficiency of a refrigerant.

Means for Solving the Problems

In order to achieve the above object, a power element according to the present invention includes a diaphragm; an upper lid member that is joined to one side of an outer circumferential portion of the diaphragm and that forms a pressure working chamber with the diaphragm; and a receiving member that is joined to another side of an outer circumferential portion of the diaphragm and that forms a refrigerant inflow chamber with the diaphragm, wherein a plate thickness near a support point of the diaphragm is thicker than a plate thickness at a central portion of the diaphragm.

Advantageous Effects of Invention

According to the present invention, it is possible to provide a power element and an expansion valve using same that are capable of suppressing local deformation of a diaphragm or the like while ensuring the transfer efficiency of a refrigerant.

DESCRIPTION OF EMBODIMENT(S)

Hereinafter, the embodiments according to the present invention will be described with reference to the figures.

Definition of Directions

In the present specification, the direction extending from the valve element 3 toward the operation rod 5 is defined as the "upward direction," and the direction extending from the operation rod 5 toward the valve element 3 is defined as the "downward direction." Accordingly, in the present specification, the direction extending from the valve element 3 toward the operation rod 5 is referred to as the "upward direction" regardless of the orientation of the expansion valve 1.

First Embodiment

Figure 1:
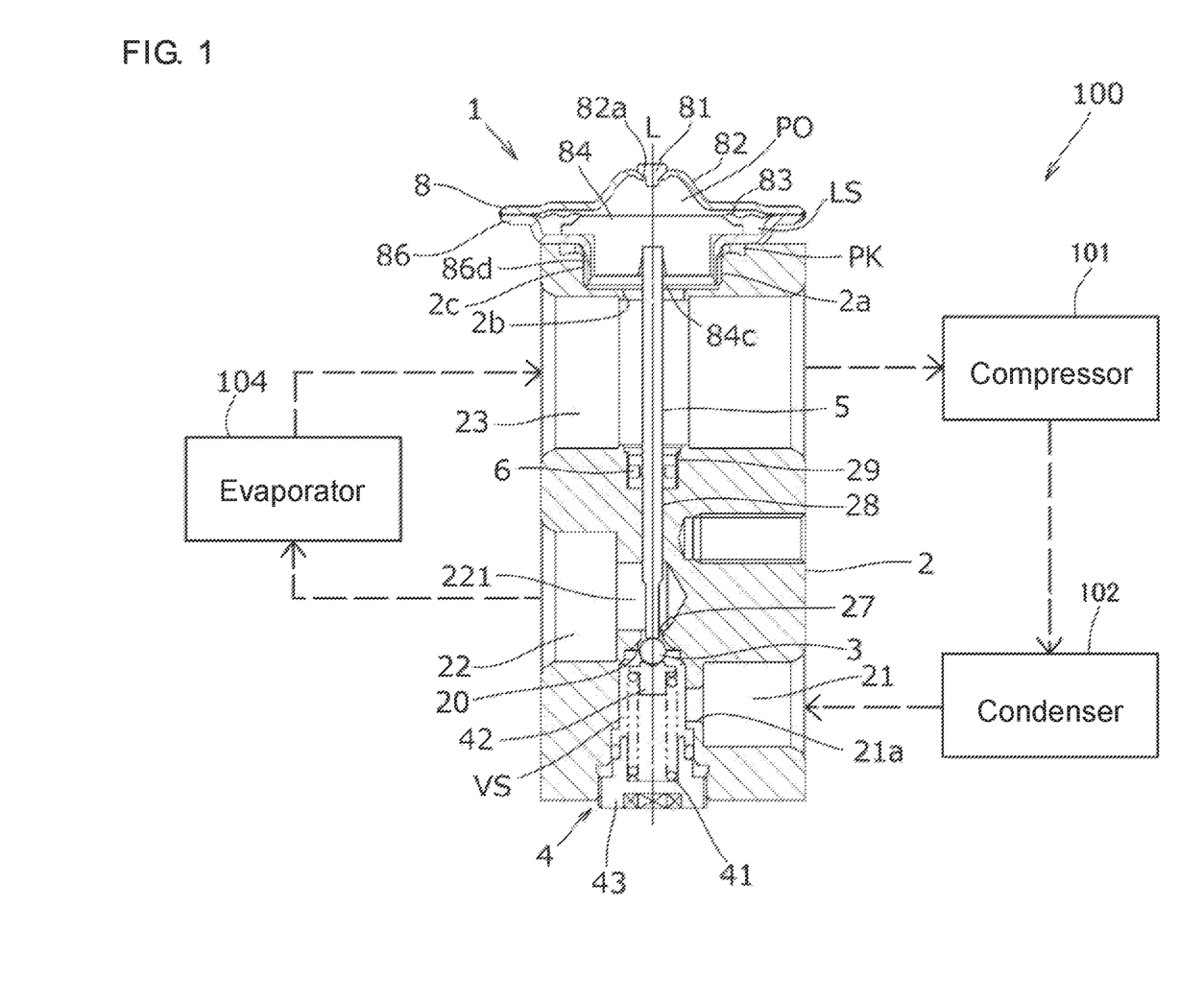
FIG. 1 is a schematic cross-sectional view schematically illustrating an example in which the expansion valve according to a first embodiment is applied to a refrigerant circulation system.

An overview of an expansion valve 1 including a power element according to the first embodiment will be described with reference to FIG. 1. FIG. 1 is a schematic cross-sectional view schematically illustrating an example in which the expansion valve 1 according to the present embodiments is applied to a refrigerant circulation system 100. In the present embodiment, the expansion valve 1 is fluidly connected to a compressor 101, a condenser 102, and an evaporator 104. L is set as the axis of the expansion valve 1.

In FIG. 1, the expansion valve 1 includes a valve main body 2 having a valve chamber VS, a valve element 3, a biasing device 4, an operation rod 5, and a power element 8.

The valve main body 2 includes a first flow path 21, a second flow path 22, an intermediate chamber 221, and a return flow path (also referred to as a refrigerant passage) 23 in addition to the valve chamber VS. The first flow path 21 is a supply-side flow path, and a refrigerant is supplied to the valve chamber VS via the supply-side flow path. The second flow path 22 is a discharge-side flow path, and the fluid in the valve chamber VS is discharged to the outside of the expansion valve through a valve through-hole 27, the intermediate chamber 221 and the discharge-side flow path.

The first flow path 21 and the valve chamber VS are connected with each other by a connecting path 21a having a smaller diameter than the first flow path 21. The valve chamber VS and the intermediate chamber 221 are connected with each other via the valve seat 20 and the valve through-hole 27.

The operation rod insertion hole 28 formed above the intermediate chamber 221 has a function for guiding the operation rod 5, and the annular recess 29 formed above the operation rod insertion hole 28 has a function of accommodating a ring spring 6. The ring spring 6 has a plurality of spring pieces to apply a predetermined biasing force on the outer circumference of the operation rod 5 by coming into contact therewith.

The valve element 3 is arranged in the valve chamber VS. When the valve element 3 is seated on the valve seat 20 of the valve main body 2, the flow of the refrigerant through the valve through-hole 27 is restricted. This state is referred to as a non-communicating state. However, even in the case that the valve element 3 is seated on the valve seat 20, a limited amount of refrigerant may flow. On the other hand, when the valve element 3 is separated from the valve seat 20, the flow of the refrigerant passing through the valve through-hole 27 increases. This state is referred to as a communication state.

The operation rod 5 is inserted into the valve through-hole 27 with a predetermined gap. The lower end of the operation rod 5 is in contact with the upper surface of the valve element 3. The upper end of the operation rod 5 is fitted into a fitting hole 84c of the stopper member 84, which will be described later.

The operation rod 5 can press the valve element 3 in a valve opening direction against the biasing force of the biasing device 4. When the operation rod 5 moves downward, the valve element 3 is separated from the valve seat 20 and the expansion valve 1 is opened.

In FIG. 1, the biasing device 4 includes a coil spring 41 formed by helically winding a wire member having a circular cross section, a valve element support 42, and a spring receiving member 43.

The valve element support 42 is attached to the upper end of the coil spring 41, a spherical valve element 3 is welded to the upper surface thereof, and both are integrated together.

The spring receiving member 43 that supports the lower end of the coil spring 41 can be screwed against the valve main body 2, and has a function of sealing the valve chamber VS and a function of adjusting the biasing force of the coil spring 41.

(Power Element)

Figure 2:
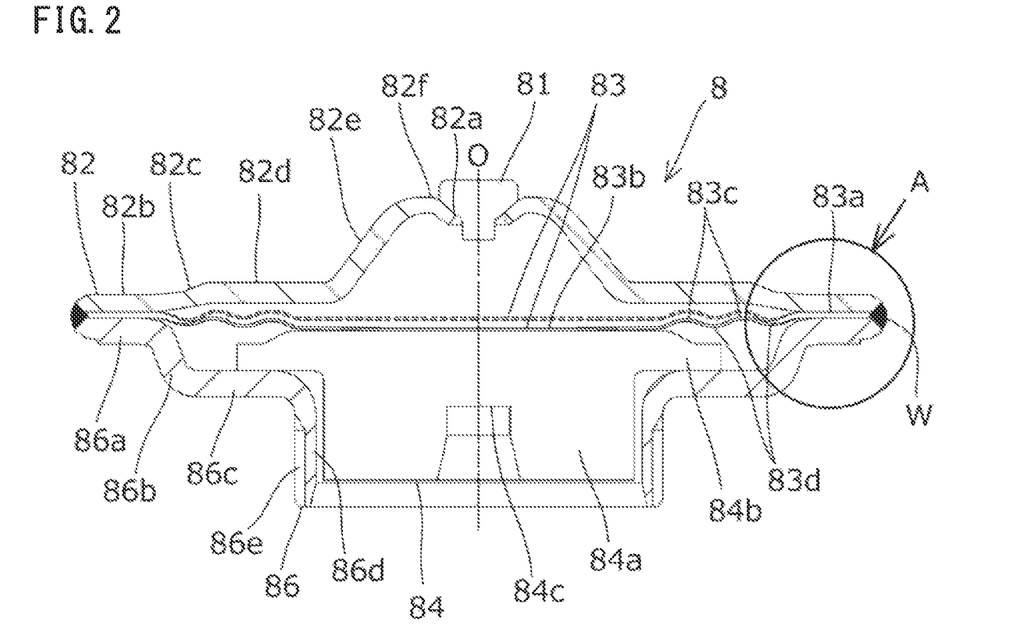
FIG. 2 is an enlarged cross-sectional view of the power element.

Next, the power element 8 will be described. FIG. 2 is an enlarged cross-sectional view of the power element 8. O is set as the axis of the power element 8. The power element 8 includes a plug 81, an upper lid member 82, a diaphragm 83, a receiving member 86, and a stopper member 84. Again, it is assumed that the upper lid member 82 side is the upper side and the receiving member 86 side is the lower side.

The upper lid member 82 is formed, for example, by molding a metal plate material by pressing. The upper lid member 82 includes an annular outer plate portion 82b, an outer tapered portion 82c that extends toward the upper side and is continuously provided on the inner circumference of the outer plate portion 82b, an annular intermediate plate portion 82d which is continuously provided on the inner circumference of the outer tapered portion 82c, an inner tapered portion 82e that extends toward the upper side and is continuously provided on the inner circumference of the intermediate plate portion 82d, and a top portion 82f which is continuously provided on the inner circumference of the inner tapered portion 82e. An opening portion 82a is formed in the center of the top portion 82f and can be sealed by the plug 81.

The receiving member 86 that opposes the upper lid member 82 is formed, for example, by molding a metal plate material by pressing. The receiving member 86 includes a flange portion 86a having an outer diameter substantially the same as the outer diameter of the outer plate portion 82b of the upper lid member 82, a conical portion 86b that extends toward the lower side and is continuously provided on the inner circumference of the flange portion 86a, an annular inner plate portion 86c continuously provided on the inner circumference of the conical portion 86b, and a hollow cylindrical portion 86d continuously provided on the inner circumference of the inner plate portion 86c. A male screw 86e is formed on the outer circumference of the hollow cylindrical portion 86d.

On the other hand, as illustrated in FIG. 1, a female screw 2c that engages with the male screw 86e is formed on the inner circumference of a recess portion 2a of the valve main body 2 to which the hollow cylindrical portion 86d is attached.

In FIG. 2, the diaphragm 83 arranged between the upper lid member 82 and the receiving member 86 is made of a thin and flexible metal (for example, SUS) plate material, and has an outer diameter that is substantially the same as the outer diameters of the upper lid member 82 and the receiving member 86.

More specifically, the diaphragm 83 has an outer circumferential portion 83a interposed between the upper lid member 82 and the receiving member 86, and a central portion 83b that comes into contact with the stopper member 84. In addition, the diaphragm 83 is coaxial with the axis O between the outer circumferential portion 83a and the central portion 83b, and is provided with a plurality of upper ring-shaped portions 83c protruding upward and a plurality of lower ring-shaped portions 83d protruding downward alternately along the radial direction. In the present embodiment, in the cross section illustrated in FIG. 2, the upper ring-shaped portion 83c and the lower ring-shaped portion 83d have a periodic shape such that a substantially sinusoidal curve is formed, but the circumferential groove-shaped upper ring-shaped portion and the lower ring-shaped portion having semicircular cross sections may be independently formed on the flat plate.

Figure 3:
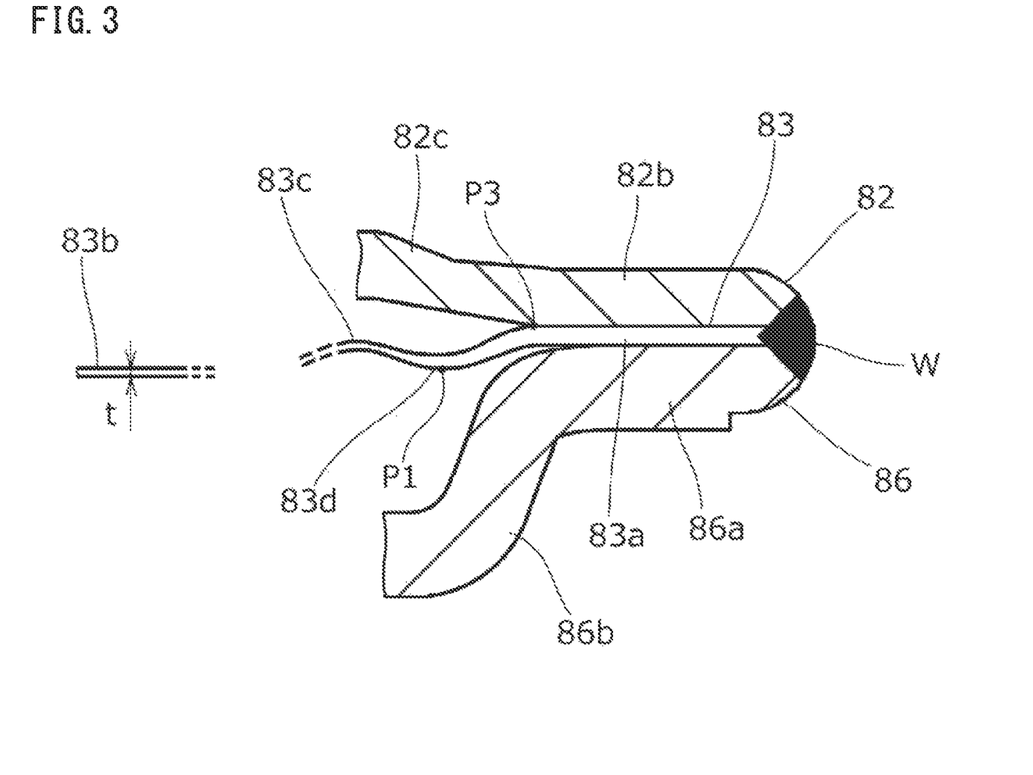
FIG. 3 is an enlarged cross-sectional view illustrating a portion A of FIG. 2 according to the first embodiment.

FIG. 3 is an enlarged cross-sectional view illustrating a portion A of FIG. 2 according to the present embodiment. The outer circumferential portion 83a is interposed between the outer plate portion 82b of the upper lid member 82 and the flange portion 86a of the receiving member 86 to hold the diaphragm 83. The outer circumferential ends of the outer plate portion 82b, the outer circumferential portion 83a, and the flange portion 86a are welded and joined, as will be described later.

The lower ring-shaped portion 83d closest to the outer circumference of the diaphragm 83 is arranged closer to the outer circumference than the upper ring-shaped portion 83c closest to the outer circumference of the diaphragm 83, and a gap is formed between the lower ring-shaped portion 83d and the receiving member 86.

In the present embodiment, the plate thickness of the outer circumferential portion 83a is thicker than the plate thickness of the central portion 83b of the diaphragm 83. More specifically, the plate thickness t of the diaphragm 83 is substantially constant from the central portion 83b to the apex P1 of the lower ring-shaped portion 83d closest to the outer circumference, but the plate thickness t gradually increases from the apex P1 of the lower ring-shaped portion 83d closest to the outer circumference to the contact point P3 of the outer circumferential portion 83a that first contacts the upper lid member 82. The plate thickness t of the outer circumferential portion 83a is constant on the outer circumferential side from the contact point P3. The contact point P3 is near the support point of the diaphragm 83.

In FIG. 2, the stopper member 84 has a cylindrical main body 84a, a disk portion 84b that is continuously provided on the upper end of the main body 84a and extends in the radial direction, and a blind hole-shaped fitting hole 84c formed in the center of the lower surface of the main body 84a. The disk portion 84b is in contact with the lower surface of the central portion 83b of the diaphragm 83.

Next, the assembly procedure of the power element 8 will be described. While placing the stopper member 84 between the diaphragm 83 and the receiving member 86, the outer plate portion 82b of the upper lid member 82, the outer circumferential portion 83a of the diaphragm 83, and the flange portion 86a of the receiving member 86 are overlapped in this order and pressed in the axial direction. Meanwhile, the outer circumference is welded by, for example, TIG welding, laser welding, plasma welding, or the like to form a welded portion W over the entire circumference, such that the components are integrated.

Subsequently, the working gas is sealed in the space (referred to as the pressure working chamber PO) surrounded by the upper lid member 82 and the diaphragm 83 from the opening 82a formed in the upper lid member 82, and then the opening 82a is sealed with the plug 81. Further, the plug 81 is fixed to the upper lid member 82 by projection welding or the like.

At this time, since the diaphragm 83 receives pressure in a form of projecting toward the receiving member 86 due to the working gas sealed in the pressure working chamber PO, the central portion 83b of the diaphragm 83 comes into contact with and is supported by the upper surface of the stopper member 84 arranged in the lower space (refrigerant inflow chamber) LS surrounded by the diaphragm 83 and the receiving member 86.

When the power element 8 assembled as described above is attached to the valve main body 2, the axis O is aligned with the axis L, and the male screw 86e on the outer circumference of the lower end of the hollow cylindrical portion 86d of the receiving member 86 engages with the female screw 2c formed on the inner circumference of the recess portion 2a of the valve main body 2. When the male screw 86e of the hollow cylindrical portion 86d is screwed with respect to the female screw 2c, the inner plate portion 86c of the receiving member 86 comes into contact with the upper end surface of the valve main body 2. As a result, the power element 8 can be fixed to the valve main body 2.

At this time, a packing PK is interposed between the power element 8 and the valve main body 2, and the space in the recess portion 2a connected to the lower space LS is sealed to prevent the refrigerant from leaking from the recess portion 2a. In this state, the lower space LS of the power element 8 communicates with the return flow path 23 via the communication hole 2b.

(Operation of the Expansion Valve)

An example of the operation of the expansion valve 1 will be described with reference to FIG. 1. The refrigerant pressurized by the compressor 101 is liquefied by the condenser 102 and sent to the expansion valve 1. Further, the refrigerant adiabatically expanded by the expansion valve 1 is sent to the evaporator 104, and the evaporator 104 exchanges heat with the air flowing around the evaporator. The refrigerant returning from the evaporator 104 is returned to the compressor 101 side through the expansion valve 1 (more specifically, the return flow path 23). At this time, by passing through the evaporator 104, the fluid pressure in the second flow path 22 becomes larger than the fluid pressure in the return flow path 23. A high-pressure refrigerant is supplied to the expansion valve 1 from the condenser 102. More specifically, the high-pressure refrigerant from the condenser 102 is supplied to the valve chamber VS via the first flow path 21.

When the valve element 3 is seated on the valve seat 20 (when in the non-communicating state), the flow rate of the refrigerant sent from the valve chamber VS to the evaporator 104 through the valve through-hole 27, the intermediate chamber 221 and the second flow path 22 is limited. On the other hand, when the valve element 3 is separated from the valve seat 20 (when in the communicating state), the flow rate of the refrigerant sent from the valve chamber VS to the evaporator 104 through the valve through-hole 27, the intermediate chamber 221 and the second flow path 22 increases. Switching between the closed state and the open state of the expansion valve 1 is performed by the operation rod 5 connected to the power element 8 via the stopper member 84.

In FIG. 1, a pressure working chamber PO and a lower space LS partitioned by a diaphragm 83 are provided inside the power element 8. Accordingly, when the working gas in the pressure working chamber PO is liquefied, the diaphragm 83 rises (illustrated by the dashed line in FIG. 2), such that the stopper member 84 and the operation rod 5 move upward according to the biasing force of the coil spring 41. On the other hand, when the liquefied working gas is vaporized, the diaphragm 83 and the stopper member 84 are pressed downward (illustrated by the solid line in FIG.

2), such that the operation rod 5 moves downward. In this way, the expansion valve 1 is switched between an open state and a closed state.

Further, the lower space LS of the power element 8 communicates with the return flow path 23. Accordingly, the volume of the working gas in the pressure working chamber PO changes according to the temperature and pressure of the refrigerant flowing through the return flow path 23, and the operation rod 5 is driven. In other words, in the expansion valve 1 illustrated in FIG. 1, the amount of the refrigerant supplied from the expansion valve 1 toward the evaporator 104 is automatically adjusted according to the temperature and pressure of the refrigerant returning from the evaporator 104 to the expansion valve 1.

Comparative Example

Figure 4:
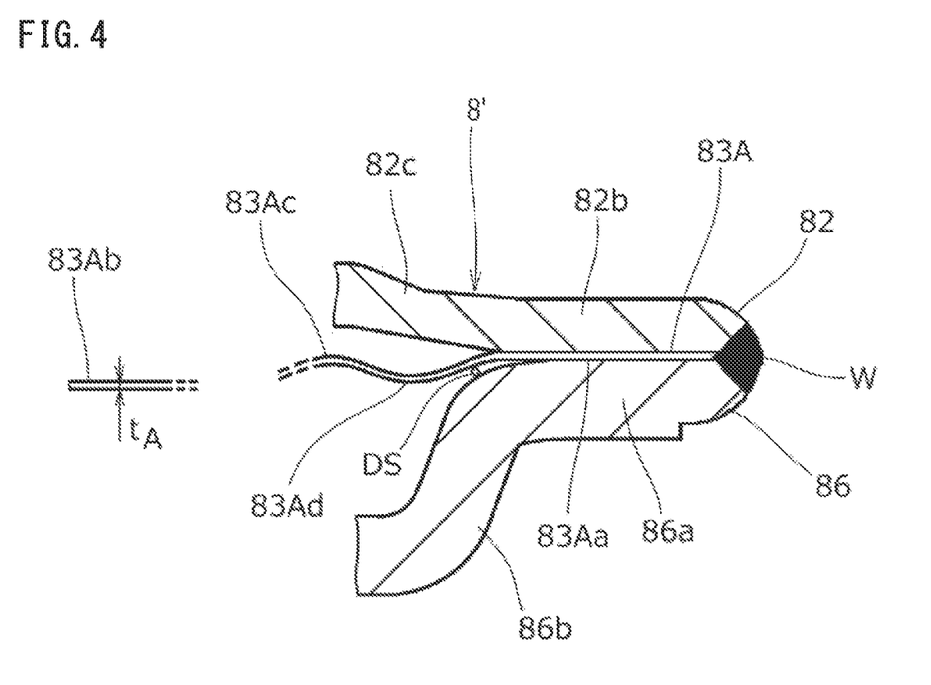
FIG. 4 is a cross-sectional view illustrating an enlarged portion corresponding to the portion A of FIG. 2 in a comparative example.

Next, the effects of the present embodiment will be described with reference to a comparative example. FIG. 4 is a cross-sectional view illustrating an enlarged portion corresponding to a portion A of the power element 8' of FIG. 2 according to a comparative example. As in the present embodiment, the power element 8' according to the comparative example has an outer circumferential portion 83Aa and a central portion 83Ab, and also has a plurality of upper ring-shaped portions 83Ac and a plurality of lower ring-shaped portions 83Ad, but it differs from the present embodiment in that the plate thickness $t_A$ is constant. Since the configurations of the upper lid member 82, the receiving member 86, and the stopper member 84 are the same as those of the present embodiment, the same reference numerals are given and redundant description will be omitted.

Here, during the operation of the refrigeration circulation system 100, foreign matter DS such as metal powder mixed in the refrigerant may enter the lower space LS via the return flow path 23. In such a case, as illustrated in FIG. 4, the foreign matter DS may enter the gap between the diaphragm 83A and the receiving member 86, and the foreign matter DS may be caught between the diaphragm 83A and the receiving member 86 due to the downward displacement of the diaphragm 83A. Since the diaphragm 83A is formed of a very thin metal plate, when the relatively hard foreign matter DS becomes caught, stress concentration may occur, causing local deformation and, in some cases, deteriorating the operating characteristics of the power element 8'.

On the other hand, increasing the plate thickness $t_A$ of the diaphragm 83A to increase its strength to prevent local deformation even in the case that foreign matter is caught can be considered. However, if the plate thickness $t_A$ of the diaphragm 83A is uniformly increased, the rigidity of the diaphragm 83A increases and it becomes difficult to bend, which deteriorates the operating characteristics of the power element 8'.

In contrast, according to the power element 8 of the present embodiment, with reference to FIG. 3, since the plate thickness t is particularly increased at the location where foreign matter DS is caught from the apex of the lower ring-shaped portion 83d closest to the outer circumference of the diaphragm 83 to the outer circumferential side, local deformation of the diaphragm 83 can be suppressed. As a result, a normal strainer (not illustrated in the Figure) used in the refrigeration circulation system 100 can be used, and the efficiency of transporting the refrigerant is not reduced.

On the other hand, since the plate thickness t of the diaphragm 83 is substantially constant in the radial direction from the apex of the lower ring-shaped portion 83d closest to the outer circumference of the diaphragm 83, the diaphragm 83 of the present embodiment is easily bent like the diaphragm 83A of the comparative example, and therefore, the operating characteristics of the power element 8 are not deteriorated in comparison with the power element 8' of the comparative example.

In order to suppress local deformation of the power element due to foreign matter becoming caught, it is not strictly necessary to increase the plate thickness of the diaphragm 83 in the radial direction from the apex of the lower ring-shaped portion 83d closest to the outer circumference. For instance, it is sufficient to increase the plate thickness in the vicinity of the support point of the diaphragm 83, where foreign matter is likely to be caught.

The "support point" includes a support point on the upper lid member side and a support point on the receiving member side. When the diaphragm bends and becomes displaced, the "support point on the upper lid member side" refers to the point on the upper lid member that is in contact with the boundary point between a portion (that does not displace toward the upper lid member side) where the diaphragm is restricted by coming into contact with the upper lid member and a portion displaced toward the upper lid member side. In the example illustrated in FIG. 3, the contact point P3 serves as a support point on the upper lid member 82 side.

In addition, when the diaphragm bends and becomes displaced, the "support point on the receiving member side" refers to the point on the receiving member that is in contact with the boundary point between a portion (that does not displace toward the receiving member side) where the diaphragm is restricted by coming into contact with the receiving member and a portion displaced toward the receiving member side.

Further, "near the support point" is preferably in the range of ±0.1 R in the radial direction around the support point, and more preferably in the range of ±0.05 R, where the radius of the diaphragm is R.

The plate thickness of the outer portion of the diaphragm is preferably thicker than the plate thickness of the central portion, and more preferably 1.3 times or more the plate thickness of the central portion.

Second Embodiment

Figure 5:
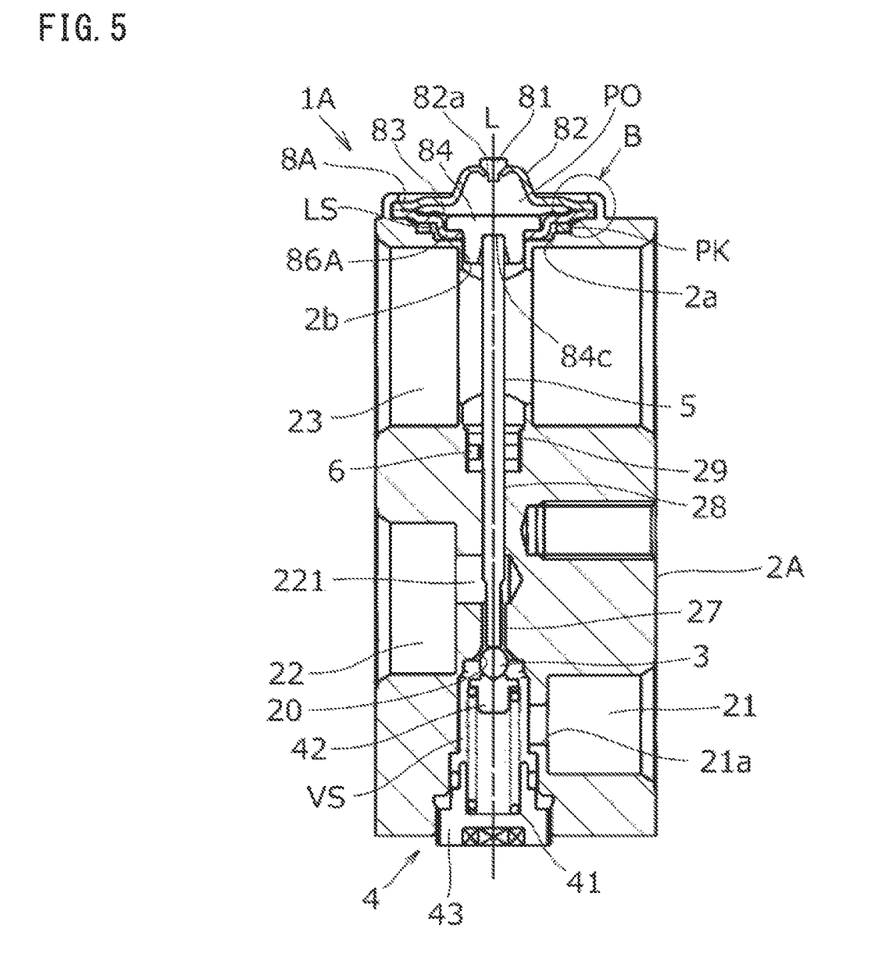
FIG. 5 is a schematic cross-sectional view illustrating an expansion valve according to the second embodiment.
Figure 6:
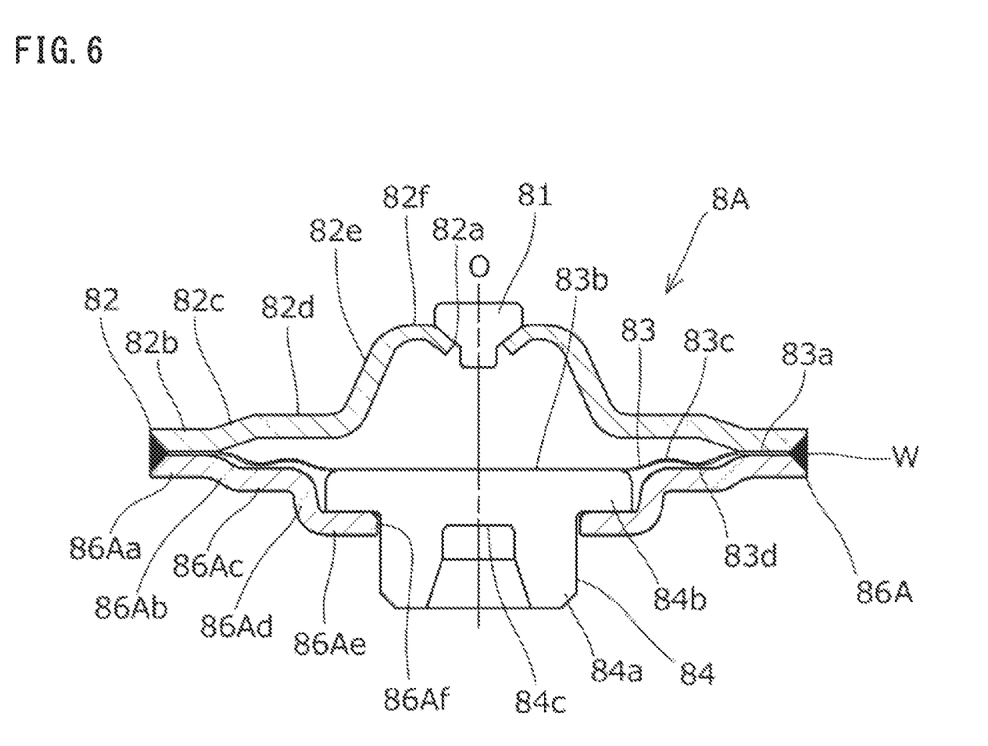
FIG. 6 is a cross-sectional view of the power element 8A according to the second embodiment.
Figure 7:
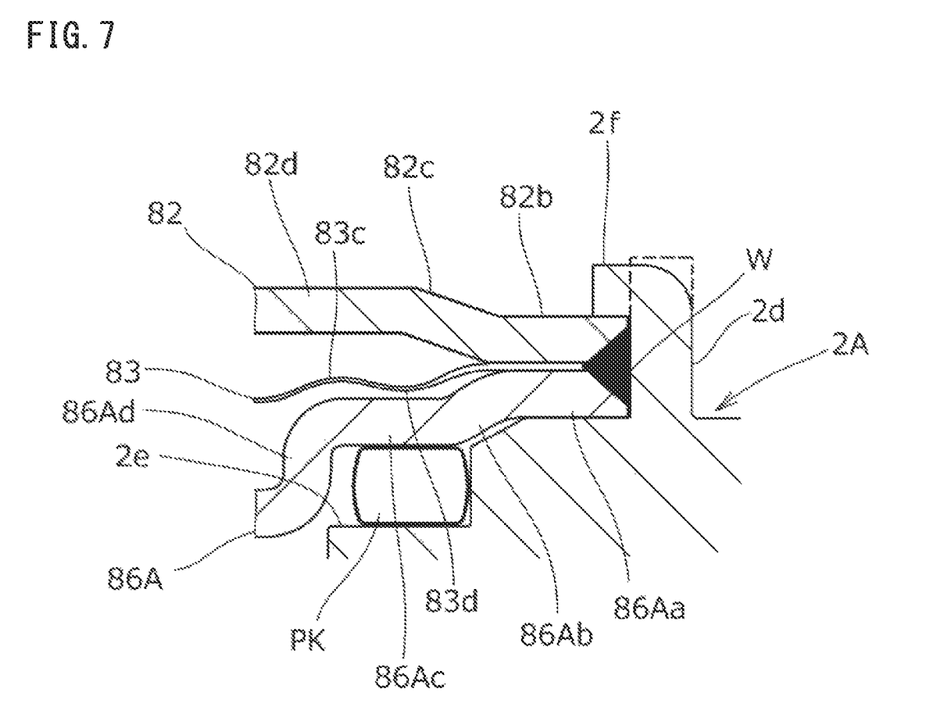
FIG. 7 is a cross-sectional view illustrating an enlarged portion B of FIG. 5 according to the second embodiment.

FIG. 5 is a schematic cross-sectional view illustrating the expansion valve 1A according to the second embodiment. FIG. 6 is a cross-sectional view of the power element 8A according to the second embodiment. FIG. 7 is a cross-sectional view illustrating an enlarged portion B of FIG. 5 according to the second embodiment.

The expansion valve 1A illustrated in FIG. 5 differs from the expansion valve 1 according to the first embodiment in the power element 8A and the upper configuration of the valve main body 2A. That is, in the present embodiment, the power element 8A and the valve main body 2A are not connected by engaging a screw, and the connection between the two is performed by caulking. Since the rest of the configuration is the same as that of the first embodiment, the same reference numerals are given and redundant description will be omitted.

In FIG. 6, the power element 8A includes a plug 81, an upper lid member 82, a diaphragm 83, a receiving member 86A, and a stopper member 84. Again, it is assumed that the upper lid member 82A side is the upper side and the receiving member 86A side is the lower side. It should be noted that the stopper member need not be provided.

In the power element 8A according to the present embodiment, only the configuration of the receiving member 86A is primarily different from that of the power element 8 according to the first embodiment. Since the plug 81, the upper lid member 82, the diaphragm 83, and the stopper member 84 have basically the same configuration except for minor differences in shape, the same reference numerals are given and redundant description will be omitted.

The receiving member 86A formed by molding a metal plate material by pressing includes a flange portion 86Aa having an outer diameter substantially the same as the outer diameter of the outer plate portion 82b of the upper lid member 82, a conical portion 86Ab that extends the lower side and that is continuously provided on the inner circumference of the flange portion 86Aa, an annular intermediate plate portion 86Ac continuously provided on the inner circumference of the conical portion 86Ab, a hollow cylindrical portion 86Ad continuously provided on the inner circumference of the intermediate plate portion 86c, and an annular inner plate portion 86Ae continuously provided on the inner circumference of the hollow cylindrical portion 86Ad. The inner plate portion 86Ae includes a central opening portion 86Af into which the main body 84a of the stopper member 84 is fitted.

When assembling the power element 8A, while placing the stopper member 84 between the diaphragm 83 and the receiving member 86A, the outer plate portion 82b of the upper lid member 82, the outer circumferential portion 83a of the diaphragm 83, and the flange portion 86Aa of the receiving member 86A are overlapped in this order and pressed in the axial direction. Meanwhile, the outer circumference is welded by, for example, TIG welding, laser welding, plasma welding, or the like to form a welded portion W over the entire circumference, such that the components are integrated.

Subsequently, the working gas is sealed in the space surrounded by the upper lid member 82 and the diaphragm 83 from the opening 82a formed in the upper lid member 82, and then the opening 82a is sealed with the plug 81. Further, the plug 81 is fixed to the upper lid member 82 by projection welding or the like. In this way, the power element 8A can be assembled.

In FIG. 7, the valve main body 2A formed of a metal such as aluminum includes a circular tube portion 2d extending from the upper end thereof. The inner diameter of the circular tube portion 2d is equal to or slightly larger than the outer diameter of the power element 8A.

Prior to attaching the power element 8A to the valve main body 2A, the circular tube portion 2d has a cylindrical shape coaxial with axis L (FIG. 5), as illustrated by the dotted line. When attaching the power element 8A to the valve main body 2A, an annular packing PK is arranged on the step portion 2e of the valve main body 2A, and the power element 8A is made to approach the valve main body 2A from the receiving member 86A side, and is fit into the circular tube portion 2d. At this time, the packing PK is interposed between the intermediate plate portion 86Ac and the step portion 2e.

In this state, when the tip of the circular tube portion 2d is caulked inward using a caulking tool (not illustrated in the Figures), the tip of the circular tube portion 2d is plastically deformed toward the axis L to form an annular caulked portion 2f. The outer circumferential upper surface of the outer plate portion 82b of the upper lid member 82 is pressed and fixed by the caulked portion 2f. As a result, the packing PK is compressed in the axis L direction between the intermediate plate portion 86Ac and the step portion 2e, the space in the recess portion 2a connected to the lower space LS is sealed, and leakage of the refrigerant from the recess portion 2a is prevented.

The expansion valve 1A illustrated in FIG. 5 can also be incorporated into the refrigerant circulation system 100 illustrated in FIG. 1, and exhibits the same functions as the expansion valve 1 according to the first embodiment.

It should be noted that the present invention is not limited to the above-described embodiments. Within the scope of the present invention, any component of the above-described embodiments can be modified. In addition, any component can be added or omitted in the above-described embodiments.

REFERENCE SIGNS LIST

1, 1A . . . Expansion valve
2, 2A . . . Valve main body
3 . . . Valve element
4 . . . Biasing device
5 . . . Operation rod
6 . . . Ring spring
8, 8A . . . Power element
20 . . . Valve seat
21 . . . First flow path
22 . . . Second flow path
221 . . . Intermediate chamber
23 . . . Return flow path
27 . . . Valve through hole
28 . . . Operation rod insertion hole
29 . . . Annular recess
41 . . . Coil spring
42 . . . Valve element support
43 . . . Spring receiving member
81 . . . Plug
82 . . . Upper lid member
83 . . . Diaphragm
84 . . . Stopper member
86, 86A . . . Receiving member
100 . . . Refrigerant circulation system
101 . . . Compressor
102 . . . Condenser
104 . . . Evaporator
VS . . . Valve chamber
P1 . . . Apex of the lower ring-shaped portion
P3 . . . Contact point

The invention claimed is:

1. A power element comprising:
a diaphragm;
an upper lid member that is joined to one side of an outer circumferential portion of the diaphragm and that forms a pressure working chamber with the diaphragm; and
a receiving member that is joined to another side of an outer circumferential portion of the diaphragm and that forms a refrigerant inflow chamber with the diaphragm,
wherein a plate thickness near a support point of the diaphragm is thicker than a plate thickness at a central portion of the diaphragm,
wherein the diaphragm includes:
an upper ring-shaped portion protruding toward an upper lid member side, and
a lower ring-shaped portion protruding toward a receiving member side;
the upper ring-shaped portion and the lower ring-shaped portion are formed coaxially with a center of the diaphragm; and a plate thickness of the diaphragm on an outer circumferential side of an apex of the lower ring-shaped portion closest to an outer circumference is thicker than a plate thickness at the central portion of the diaphragm and the plate thickness of the diaphragm gradually increases from the apex of the lower ring-shaped portion closest to the outer circumference to a contact point of the outer circumferential portion that first contacts the upper lid member.

2. An expansion valve comprising:
a power element including
   a diaphragm;
   an upper lid member that is joined to one side of an outer circumferential portion of the diaphragm and that forms a pressure working chamber with the diaphragm; and
   a receiving member that is joined to another side of an outer circumferential portion of the diaphragm and that forms a refrigerant inflow chamber with the diaphragm,
   wherein a plate thickness near a support point of the diaphragm is thicker than a plate thickness at a central portion of the diaphragm;
a valve main body provided with a refrigerant flow path communicating with the refrigerant inflow chamber, having a valve chamber and a valve seat;
a valve element disposed in the valve chamber;
a coil spring that presses the valve element toward the valve seat; and
an operation rod having one end in contact with the valve element,
wherein the diaphragm is displaced by a pressure difference between a pressure working chamber of the power element and the refrigerant inflow chamber to drive the valve element against a biasing force of the coil spring.

3. The power element according to claim 1, further comprising:
a stopper member housed in the refrigerant inflow chamber and in contact with the diaphragm.

4. The expansion valve according to claim 2, wherein:
the diaphragm includes:
   an upper ring-shaped portion protruding toward an upper lid member side, and
   a lower ring-shaped portion protruding toward a receiving member side;
   the upper ring-shaped portion and the lower ring-shaped portion are formed coaxially with a center of the diaphragm; and
   a plate thickness of the diaphragm on an outer circumferential side of an apex of the lower ring-shaped portion closest to an outer circumference is thicker than a plate thickness at the central portion of the diaphragm.

5. The expansion valve according to claim 4, wherein:
the plate thickness of the diaphragm gradually increases from the apex of the lower ring-shaped portion closest to the outer circumference, to a contact point of the outer circumferential portion that first contacts the upper lid member.

6. The expansion valve according to claim 2, further comprising:
a stopper member housed in the refrigerant inflow chamber and in contact with the diaphragm.

* * * * *